(12) United States Patent
Yan et al.

(10) Patent No.: US 12,394,198 B1
(45) Date of Patent: Aug. 19, 2025

(54) METHOD FOR CONSTRUCTING SPATIAL SCENARIOS BASED ON BLUE-GREEN-GREY RATIO

(71) Applicant: Institute of Geographic Sciences and Natural Resources Research, Chinese Academy of Sciences, Beijing (CN)

(72) Inventors: Fengqin Yan, Beijing (CN); Tingting Pan, Beijing (CN); Fenzhen Su, Beijing (CN)

(73) Assignee: Institute of Geographic Sciences and Natural Resources Research, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/071,797

(22) Filed: Mar. 6, 2025

(30) Foreign Application Priority Data

Mar. 15, 2024 (CN) .......................... 202410295227.7

(51) Int. Cl.
*G06V 20/13* (2022.01)
*G06V 10/26* (2022.01)
(Continued)

(52) U.S. Cl.
CPC .............. *G06V 20/13* (2022.01); *G06V 10/26* (2022.01); *G06V 10/52* (2022.01); *G06V 10/54* (2022.01);
(Continued)

(58) Field of Classification Search
CPC ........ G06V 20/13; G06V 10/26; G06V 10/52; G06V 10/54; G06V 10/56; G06V 10/72;
(Continued)

(56) References Cited

U.S. PATENT DOCUMENTS

| | | | |
|---|---|---|---|
| 9,378,509 B2 | 6/2016 | Terrazas et al. | |
| 2013/0301915 A1* | 11/2013 | Terrazas ................ | G06V 20/13 382/173 |
| 2021/0264245 A1* | 8/2021 | Heinonen .............. | G06N 3/045 |

FOREIGN PATENT DOCUMENTS

| | | |
|---|---|---|
| CN | 108320285 A | 7/2018 |
| CN | 110598514 A | 12/2019 |

(Continued)

*Primary Examiner* — Samir A Ahmed
(74) *Attorney, Agent, or Firm* — Nicholas Makridakis

(57) ABSTRACT

This application relates to the technical field of data processing and provides a method for constructing spatial scenarios based on a blue-green-grey ratio. The method first constructs a spatial scenario classification system, dividing spatial scenarios into primary and secondary spatial scenarios. Attributes corresponding to vector patches of the secondary spatial scenarios are set as follows: type name, perimeter, area, and blue-green-grey ratio. Spatial data is then preprocessed, followed by the identification of urban functional scenarios and non-urban spatial scenarios. A perimeter and an area of each spatial scenario patch are calculated and attributes of type name, perimeter, area, and blue-green-grey ratio are assigned to each spatial scenario patch. The blue-green-grey ratio attribute is used to represent the internal heterogeneity within homogeneous functional zones or the same spatial scenario. This attribute better explains the differences in land use due to varying locations, addressing the challenge in traditional land use/cover methods.

10 Claims, 2 Drawing Sheets

(51) Int. Cl.
*G06V 10/52* (2022.01)
*G06V 10/54* (2022.01)
*G06V 10/56* (2022.01)
*G06V 10/72* (2022.01)
*G06V 10/764* (2022.01)
*G06V 10/774* (2022.01)
*G06V 10/776* (2022.01)
*G06V 20/10* (2022.01)

(52) U.S. Cl.
CPC .............. *G06V 10/56* (2022.01); *G06V 10/72* (2022.01); *G06V 10/764* (2022.01); *G06V 10/774* (2022.01); *G06V 10/776* (2022.01); *G06V 20/176* (2022.01); *G06V 20/182* (2022.01); *G06V 20/188* (2022.01)

(58) Field of Classification Search
CPC .. G06V 10/764; G06V 10/774; G06V 10/776; G06V 20/176; G06V 20/182; G06V 20/188
See application file for complete search history.

(56) References Cited

FOREIGN PATENT DOCUMENTS

| | | | | |
|---|---|---|---|---|
| CN | 111598101 A | 8/2020 | | |
| CN | 112949413 A | 6/2021 | | |
| CN | 117893923 A | * | 4/2024 | ............. G06F 16/29 |

* cited by examiner

METHOD FOR CONSTRUCTING SPATIAL SCENARIOS BASED ON BLUE-GREEN-GREY RATIO

TECHNICAL FIELD

This application relates to the technical field of data processing, in particular to a method for constructing spatial scenarios based on a blue-green-gray ratio.

BACKGROUND

Traditional land cover/use classification cannot reflect the difference of land use function due to different location, while spatial scenario is a higher level of cognition and synthesis than traditional land cover/use, which can make up for the deficiency of traditional land classification, and has multi-dimensional attributes such as natural, social, economic and ecological. It is a spatial distribution of the difference of functional attributes of different geographical units. Spatial scenarios are also different from functional zoning in that they are more fine-grained and not oriented to planning goals, but are quantitative responses provided by social functions in the objective world. The spatial scenario is taken as the basic calculation unit to study its spatial topological relationships and the changes provided by social functions. On this basis, the research on ecological carrying capacity and spatial optimization is carried out to expand the idea of ecological security regulation research and provide a new method system for comprehensive assessment and regulation of regional ecological security. This is of great scientific significance for the study of geosynthetical crossover and land-sea coordination.

Some existing technologies also involve the study of spatial scenarios and provide a classification system of spatial scenarios, such as reference 1: "Discussion on Land Use/Cover Classification from a Geographical Perspective," Wang Zhihua et al., Geographical Research, 2022, constructed a spatial scenario classification system for urban functional areas, dividing urban areas into roads, industrial areas, public service areas, water bodies, residential areas, commercial areas, vegetation and bare land. Reference 2: "Changes in Ecological Carrying Capacity and Sustainability of Coastal Zones and Marine Areas in the Guangdong-Hong Kong-Macao Greater Bay Area in the past 30 Years-A New Generation Assessment Framework based on Spatial Scenarios, Tang Yuzhi et al., Acta Geographica Sinica, 2023" constructed a classification system of spatial scenario for coastal zones and maritime area, dividing coastal zones into two categories: coastal land, intertidal zones and seawater areas. The former is terrestrial ecosystem, the latter is coastal zone and Marine ecosystem. The coastal land is divided into woodland, grassland, cultivated land and artificial scenario according to the land cover and ecological function. Then, according to the dominant socio-economic attributes and ecological externalities, it is further subdivided into spatial scenarios, such as forest land divided into forests (which are not for economic activities and produce little pollution) and plantations (which are for economic activities and produce pollution). The artificial scenarios are divided into settlements, transportation logistics and energy scenarios, etc. The settlements are then subdivided into residence, public service, commercial trade and industrial production scenarios according to the types of economic activities.

Although the above classification system can solve the economic and ecological differences caused by different locations of the same land use/cover type to a certain extent, it fails to take into account the internal heterogeneity of the same spatial scenario.

Therefore, it is necessary to provide an improved technical solution to the shortcomings of the above existing technologies.

SUMMARY

An objective of this application is to provide a method for constructing spatial scenarios based on a blue-green-gray ratio to solve or mitigate the problems existing in the above existing technologies.

To achieve the above objective, this application provides the following technical solutions.

This application provides a method for constructing spatial scenarios based on a blue-green-gray ratio, including:
  constructing a spatial scenario classification system, where
  the spatial scenario classification system includes primary spatial scenarios, which are divided into agricultural functional scenarios, urban functional scenarios and ecological functional scenarios, and the coverage of each functional scenario is further divided into multiple secondary spatial scenarios, which are formed by vector patches, and each spatial scenario patch is set to contain the following attributes: type name, perimeter, area and blue-green-gray ratio; and the blue-green-gray ratio attribute is used to represent internal heterogeneity of a same spatial scenario;
  acquiring spatial data of a target study area, the spatial data at least including point of interest (POI) data, Sentinel datasets and road network data of different scales;
  preprocessing the POI data, the Sentinel datasets and the road network data of different scales respectively;
  based on the pre-processed spatial data, identifying urban functional scenarios and non-urban spatial scenarios, the non-urban spatial scenarios including the agricultural functional scenario and the ecological function scenarios; and
  for all patches contained in the identified urban functional scenarios and ecological functional scenarios, using ArcGIS software to calculate a perimeter and an area of each spatial scenario patch, and assigning the type name, perimeter, area, and blue-green-gray ratio to each spatial scenario patch.

In some alternative solutions, identifying the non-urban spatial scenarios includes the following steps:
  using a supervised classification method of Random Forest to extract the distribution of each non-urban spatial scenario based on a cloud computing platform Google Earth Engine (GEE) and combined with Sentinel images;
  the supervised classification sample points of Random Forest are extracted according to the following steps:
  extracting water bodies, cultivated land, aquaculture land, other vegetation and impervious surface from the Sentinel images, establishing interpretation keys through visual interpretation, identifying spatial scenario types of cultivated land, water bodies, aquaculture land, other vegetation, unused land and impervious surfaces, and establishing sample databases;
  when extracting training samples, the total number of different samples being 1:1, with 70% of the sample points being used for training and 30% of the sample points being used for verifying accuracy.

In some alternative solutions, after identifying the non-urban spatial scenarios, the method also includes:
using existing land use data to perform reclassifying on the non-urban spatial scenarios, to identify corresponding spatial scenarios of economic forest and grassland.

In some alternative solutions, the identification of the urban functional scenario includes the following steps:
segmenting the target study area through the road network data of different scales to obtain segmented patches;
establishing training sample points and marking the segmented patches to classify the segmented patches into an industrial scenario or non-industrial scenario in the urban functional scenario; and
identifying location-based and density-based scenarios for POI points within the non-industrial scenarios to determine a dominant spatial scenario of the non-industrial scenarios, and taking the dominant spatial scenario as an identified result for that non-industrial scenario.

In some alternative solutions, the establishing training sample points includes the following steps:
extracting, based on the Sentinel datasets, image spectrum analysis and texture information from the industrial and non-industrial scenarios, to determine optimal bands; and
establishing training sample points according to the optimal bands.

In some alternative solutions, the image spectral analysis includes:
analyzing a spectral mean, a standard deviation and brightness of industrial spatial scenarios in each band, and combining a Normalized Difference Vegetation Index (NDVI), a Normalized Difference Water Index (NDWI), and a Normalized Difference Impervious Surface Index (NDSII) to identify differential features between the industrial and non-industrial scenarios.

In some alternative solutions, the preprocessing the POI data includes the following steps:
removing duplicates and cleaning the data for repeated names and coordinates in the POI data to obtain cleaned POI data;
reclassifying the cleaned POI data to obtain reclassified POI data;
establishing a correspondence between the reclassified POI data and the secondary spatial scenarios; and
identifying location-based and density-based scenarios for the POI points within the non-industrial scenario to determine the dominant spatial scenario of the non-industrial scenario, specifically,
based on the correspondence between the reclassified POI data and the secondary spatial scenarios, identifying location-based and density-based scenarios for the POI points within the non-industrial scenario to determine the dominant spatial scenario of the non-industrial scenario.

In some alternative implementation solutions, the identifying the location-based scenarios and density-based scenarios of POI points within the non-industrial scenario includes:
classifying the POI points within the non-industrial scenario into location-based POIs and density-based POIs from the perspectives of public recognition and spatial area coverage;
for the location-based POIs, constructing a frequency density vector of corresponding scenario units and calculating a proportion of POIs within the scenario unit, if the proportion exceeds a predefined threshold, a dominant spatial scenario of the scenario unit being determined; and
for the density-based POIs, identifying the urban functional scenarios using kernel density and similarity models based on a pre-obtained table of POI geographical entity areas and weights.

In some alternative solutions, the preprocessing of the Sentinel dataset includes the following steps:
filtering the Sentinel dataset based on cloud coverage to obtain screened remote sensing images; and
applying quality control to perform low-quality area masking on the screened remote sensing images, followed by annual mean processing of the masked remote sensing images to obtain mean images.

In some alternative solutions, the preprocessing of the road network data at different scales includes the following steps:
extracting different types of roads from the road network data at different scales based on road classification to establish a dense road network; the different types of roads including one or more of the following: highways, primary roads, secondary roads, and tertiary roads;
setting different buffer widths for various types of roads;
constructing road network buffers centered on the roads within the dense road network based on the buffer widths; and
correspondingly,
the segmenting the target study area using the road network data at different scales to obtain segmented patches is specifically as follows:
using the road network buffers to segment the target study area, resulting in segmented patches.

The technical solution of the embodiment of the present application has the following beneficial effects:

In the technical solution of the present application, a spatial scenario classification system is constructed, dividing spatial scenarios into two levels: primary spatial scenarios and secondary spatial scenarios. The primary spatial scenarios include agricultural, urban, ecological, and industrial spatial scenarios, with each primary spatial scenario including multiple secondary spatial scenarios. The secondary spatial scenarios are represented by vector patches, with the attributes of these patches set as: type name, perimeter, area, and the blue-green-grey ratio. The blue-green-grey ratio is used to represent the internal heterogeneity of the same spatial scenario. Here, blue represents water bodies, green represents vegetation, and grey represents impervious surfaces. Since the blue-green-grey ratio can differentiate ecological service functions and economic outputs of the same functional type in urban and ecological leisure scenarios, it helps to describe the internal heterogeneity of homogeneous functional areas or the same spatial scenario. This approach allows for a better understanding of how land use varies with location. Based on the established classification system and the determination of vector patch attributes, the method for constructing spatial scenarios provided in an embodiment further includes the following steps: acquiring spatial data, preprocessing the spatial data, and identifying urban functional scenarios and non-urban spatial scenarios separately. Upon accurately identifying each spatial scenario, the perimeter, area, and the blue-green-grey ratio are calculated for each spatial patch, and the attributes (type name, perimeter, area, and blue-green-grey ratio) are assigned to each spatial patch. These steps form a complete process for constructing spatial scenarios, thereby addressing the challenge in traditional land use/cover studies of neglecting the internal heterogeneity within homogeneous functional areas.

BRIEF DESCRIPTION OF THE DRAWINGS

The drawings forming part of the specification of the present application are provided to further illustrate and facilitate the understanding of the application. The exemplary embodiments and their descriptions are intended to explain the application and do not constitute undue limitations on the scope of the application.

DETAILED DESCRIPTION

The following detailed description of the present application will be provided with reference to the accompanying drawings and in conjunction with the embodiments. Each example is offered to illustrate, rather than limit the scope of the application. In practice, those skilled in the art will understand that modifications and variations can be made to the present application without departing from its scope or spirit. For instance, features described as part of one embodiment may be utilized in another embodiment to create a further embodiment. Therefore, it is intended that the present application encompasses such modifications and variations within the scope of the appended claims and their equivalents.

Unless otherwise defined, all technical and scientific terms used herein have the meanings commonly understood by those skilled in the relevant technical field. The terms used herein are intended solely to describe the embodiments of the present disclosure and are not meant to limit the scope of the disclosure.

Figure 1:
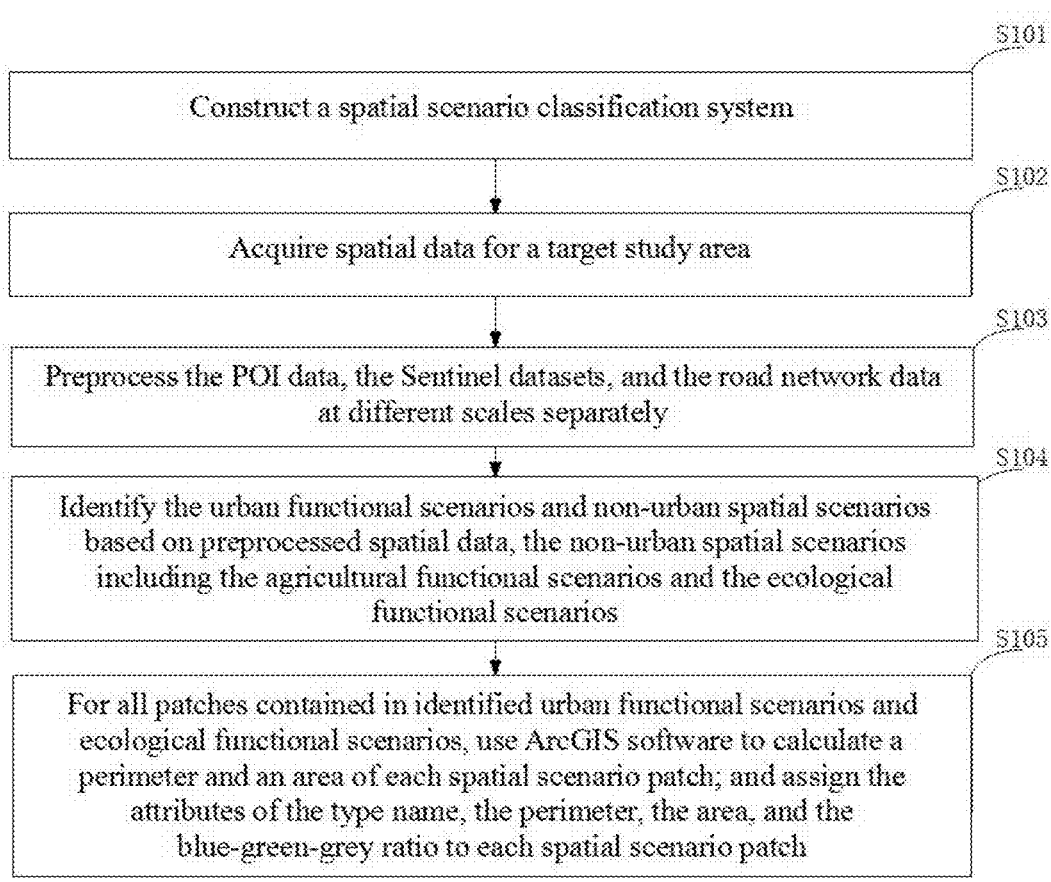
FIG. 1 is a flowchart illustrating a method for constructing spatial scenarios based on a blue-green-grey ratio, as provided in some embodiments of the present application.
Figure 3:
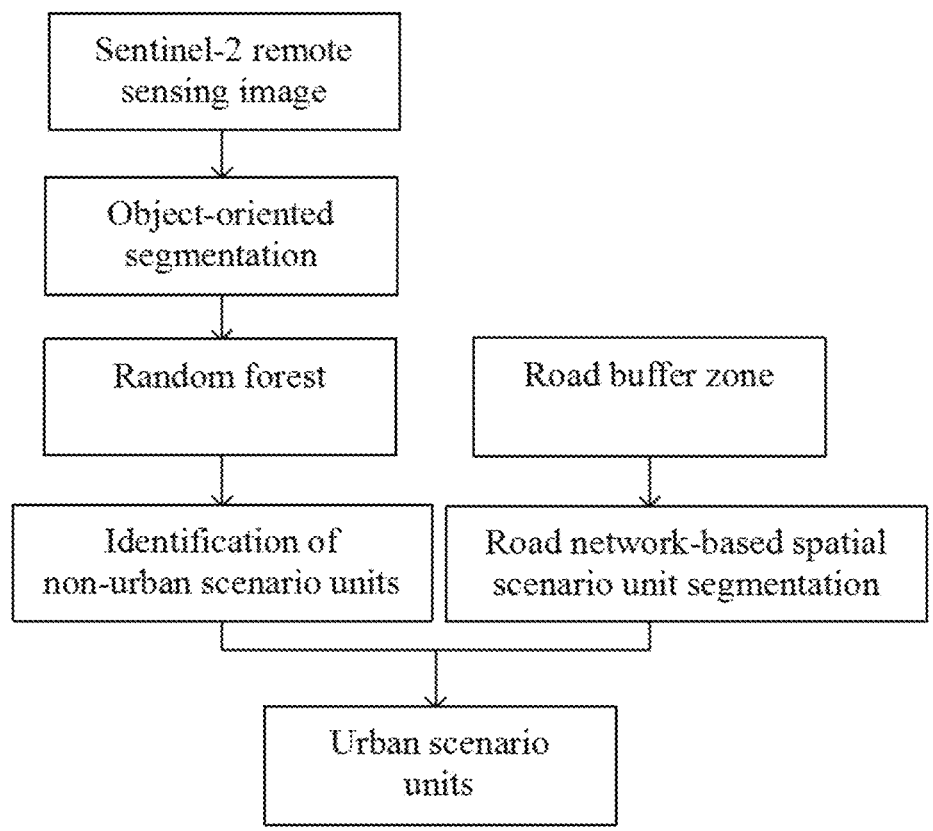
FIG. 3 is a schematic diagram illustrating the process of identifying urban functional scenarios and non-urban spatial scenario units, as provided in some embodiments of the present application.

The embodiment of the present application provides a method for constructing spatial scenarios based on a blue-green-grey ratio, as shown in FIGS. 1 and 3. The method includes the following steps:

Step S101: a spatial scenario classification system is constructed.

The spatial scenario classification system includes three primary spatial scenarios and thirteen secondary spatial scenarios. The primary spatial scenarios are divided into agricultural functional scenarios, urban functional scenarios, and ecological functional scenarios. The coverage of each functional scenario is further divided into multiple secondary spatial scenarios.

In the primary spatial scenarios, the agricultural functional scenario may include the following secondary spatial scenarios: economic forests, paddy fields, dry land, and aquaculture land. The urban functional scenario may include the following secondary spatial scenarios: industrial, service, residential, commercial, and roads. The ecological functional scenario may include the following secondary spatial scenarios: other forests, grasslands, water bodies, and unused land. The spatial scenario classification system provided in this embodiment is shown in Table 1, and Table 1 is as follows:

TABLE 1

Spatial scenario classification system

| Primary Spatial Scenario | Secondary Spatial Scenario |
|---|---|
| Agricultural Functional Scenario | Economic Forest |
| | Paddy Field |
| | Dryland Farming Area |
| | Aquaculture Land |
| Urban Functional Scenario | Industry |
| | Services (also referred to as Public Service Scenario, abbreviated as PSS) |
| | Residential |
| | Commercial |
| | Roads |
| Ecological Functional Scenario | Other Forest Land |
| | Grassland |
| | Water Body |
| | Unused Land |

From the perspective of spatial data representation and storage structure, each secondary spatial scenario is formed by vector patches. In this embodiment, based on the spatial scenario, relevant attributes are assigned to each spatial scenario patch. For example, each spatial scenario patch contains at least the following attributes: type name, perimeter, area, and blue-green-gray ratio. Among these, the type name indicates the type of spatial scenario to which the patch belongs, the perimeter and area represent the geometric properties of the patch, and the blue-green-gray ratio characterizes the internal heterogeneity within the same spatial scenario.

As previously mentioned, within the blue-green-gray ratio attribute, "blue" represents water bodies, "green" represents vegetation, and "gray" represents impervious surfaces. For each spatial scenario patch, the blue-green-gray ratio attribute is formed by three components: the blue ratio, green ratio, and gray ratio. The blue ratio is the proportion of water pixels in the image area covered by the spatial scenario patch relative to the total number of pixels. The green ratio is the proportion of vegetation pixels in the image area covered by the spatial scenario patch relative to the total number of pixels. The gray ratio is the proportion of impervious surface pixels in the image area covered by the spatial scenario patch relative to the total number of pixels. By setting the blue-green-gray ratio attribute for each spatial scenario patch, it allows for further differentiation within the same type of spatial scenario based on varying blue-green-gray ratios. This, in turn, it helps to better describe the differences in land use resulting from location-specific variations.

In some alternative examples, spatial scenario patches may also include the following attributes: a unique ID and a neighborhood ID. The unique ID is used to uniquely identify the spatial scenario patch, while the neighborhood ID is used to identify the IDs of other patches that are adjacent to the current patch.

Step S102: spatial data for a target study area is acquired. To efficiently construct spatial scenarios, the acquired spatial data include at least the following: POI data, Sentinel dataset, and road network data at different scales.

The Sentinel dataset can be provided by cloud computing platforms such as GEE. For example, Sentinel-2 data from the year 2020 can be selected, with remote sensing images filtered to ensure that cloud cover is less than 20%.

POI data refers to information about locations on a map or within a geographic information system (GIS) that are considered interesting, useful, or important. This data can be provided by platforms such as Amap (Gaode Map). Amap, as a spatial data provider, categorizes POI data into 13 different categories, which include dining services, shopping services, financial and insurance services, sports and recreation, companies and enterprises, commercial and residential areas, among others.

Road network data at different scales can be obtained from various data sources, such as transportation management departments or surveying and mapping agencies. This application does not impose any restrictions on the specific sources of the aforementioned spatial data.

Step S103: the POI data, the Sentinel dataset, and the road network data at different scales are preprocessed separately.

Preprocessing can effectively enhance data quality, improve the accuracy of spatial scenario identification, and increase the precision of blue-green-gray ratio extraction. The specific preprocessing steps may include: data cleaning and reclassification for POI data, quality control for the Sentinel dataset, and selection of road network data, among others. These steps will be described in detail in the following procedures.

Step S104: based on the preprocessed spatial data, urban functional scenarios and non-urban spatial scenarios are identified; and the non-urban spatial scenarios include agricultural functional scenarios and ecological functional scenarios.

Step S105: for all patches included in the identified urban functional scenarios and ecological functional scenarios, ArcGIS software is used to calculate the perimeter and area of each spatial scenario patch. The type name, perimeter, area, and blue-green-gray ratio attributes are assigned to each spatial scenario patch.

In this embodiment, a spatial scenario classification system is constructed, spatial data for the target study area is acquired, and the spatial data is preprocessed. Based on the preprocessed spatial data, urban functional scenarios and non-urban spatial scenarios are identified. Finally, the type name, perimeter, area, and blue-green-gray ratio attributes are assigned to each spatial scenario patch, resulting in spatial scenario patches with blue-green-gray ratio attributes. This enables the use of the blue-green-gray ratio attributes of each spatial scenario patch to characterize the internal heterogeneity within the scenario.

Since spatial scenario classification operates at a finer scale than traditional land-use classification, the required data primarily includes POI data, Sentinel datasets, and road network data at different scales. To ensure the effectiveness of spatial scenario identification, it is necessary to preprocess the POI data, Sentinel dataset, and road network data at different scales separately.

To effectively identify POI types and prevent the negative impact of duplicate names and overlapping coordinates (i.e., identical latitude and longitude) on scenario identification, step S103 involves preprocessing the POI data, which includes the following procedures: first, deduplicating and cleaning the duplicate names and overlapping coordinate data within the POI dataset to obtain the cleaned POI data; second, performing reclassification on the cleaned POI data to generate the reclassified POI data; and finally, categorizing the reclassified POI data into different spatial scenarios.

In this embodiment, the deduplication and cleaning of the POI data can be specifically implemented through the following steps: first, MySQL is used to filter detailed coordinate information, identifying data with identical coordinates (including duplicate names, i.e., names that are the same, and duplicate coordinate data, i.e., overlapping latitude and longitude). The POIs identified as duplicates are then deleted, achieving the goal of data cleaning. Next, considering that the POI data classification in Gaode Map does not align with the spatial scenario classification system constructed in the previous steps, it is necessary to perform reclassification. Specifically, each POI in the dataset is classified into secondary spatial scenarios such as commercial, residential, industrial, and service. The correspondence between the POI categories in Gaode Map and the spatial scenario classification system is shown in Table 2, as follows:

TABLE 2

The correspondence between Amap (Gaode Map) POI data categories and the spatial scenario classification system

| Primary category (i.e., secondary spatial scenarios) | Secondary category (as classified in Gaode Map) | Tertiary category (as classified in Gaode Map) |
|---|---|---|
| Commercial scenarios | Catering Services | Fast food restaurants, Western restaurants, Chinese restaurants, etc |
| | Shopping Services | Supermarkets, shopping malls, convenience stores, etc |
| | Financial and insurance services | Banks, insurance companies, securities companies, finance companies, etc |
| | Life service | Office, talent market, information consulting center, telecommunications business hall, etc |
| | Accommodation service | Hotel, hostel, guest house, etc |
| Public service scenario | Science, education and cultural services | Schools, media organizations, libraries, museums, science and technology museums, president's centers, etc |
| | Medical care service | General hospital, specialized hospital, clinic, etc |
| | Government agencies and social organizations | Government agencies, social organizations, public security agencies, airports, railway stations, ports, etc |
| | Sports and leisure | |
| Industrial scenario | Company enterprise | Metallurgy, chemical industry, mining companies, factories, mechanical electronics, etc |
| Residential scenario | Commercial residence | Residential center, villas, dormitories, commercial and residential buildings, etc |

Furthermore, to enhance the effectiveness of the Sentinel dataset, some embodiments involve preprocessing the dataset through the following steps: first, filtering the Sentinel dataset based on cloud cover to obtain the filtered remote sensing images; second, applying quality control to perform masking on low-quality regions of the filtered remote sensing images, and then conducting mean processing on the masked images by year to obtain the mean image.

In this embodiment, the selected Sentinel dataset is the 2020 Sentinel-2 data, which is filtered to control cloud cover to below 20%. Subsequently, quality control is applied to perform masking on low-quality regions of the filtered remote sensing images to improve data quality. Quality control, also known as quality assessment (QA), refers to the QA data typically included in Sentinel-2 Level-2A products. QA data provides quality information for each pixel, such as cloud masking information, cloud shadow data, snow and ice coverage, and water body detection. By utilizing this information, low-quality regions in the Sentinel-2 dataset can be effectively identified. For instance, specific thresholds are set, and certain flags or values are selected to determine low-quality areas, which are then masked to yield higher-quality remote sensing images. Next, mean processing is performed on the entire dataset for the year derived from the low-quality masked regions to obtain the mean image. In this embodiment, the mean image computed annually is used for spatial scenario identification, which highlights the long-term trends of the target study area, enhancing the stability of spatial scenario identification. Moreover, using annual mean images reduces the impact of clouds and meteorological conditions on the data, further improving its quality.

Considering that spatial scenarios are formed by various land cover objects represented as vector patches, obtaining road network data at different scales and using road network segmentation to derive vector patches is an easily implementable and effective method for representing the internal heterogeneity of spatial scenarios. This approach allows for a detailed partitioning of the scenario, capturing the diversity of land cover types and their spatial relationships, which is crucial for accurately analyzing and recognizing the structure of spatial scenarios.

To reduce the disparities between urban and suburban road networks and improve the quality of road network data, some embodiments include a preprocessing step for road network data at different scales, as outlined below: roads of various types are extracted from the road network data at different scales according to road classification, in order to establish a dense road network. The road types include one or more of the following: highways, primary roads, secondary roads, and tertiary roads. Different buffer widths are set for different types of roads. Based on the buffer width, road network buffer zones are constructed around the roads in the dense road network.

Specifically, in this embodiment, four types of roads have been selectively chosen, including highways, primary roads, secondary roads, and tertiary roads. According to the regulations outlined in the Technical Guidelines for Site Selection and Construction Planning of Central Urban Areas from the National Land Spatial Planning, tertiary roads are spaced no more than 1,000 meters apart, with at least 10 roads per 1,000 meters and a road density of no less than 100 meters per hectare. Even in suburban areas, tertiary roads are still present. Therefore, by establishing a dense road network that includes tertiary roads, the approach can effectively address the significant differences in road network distribution density between urban areas and suburban regions.

Figure 2:
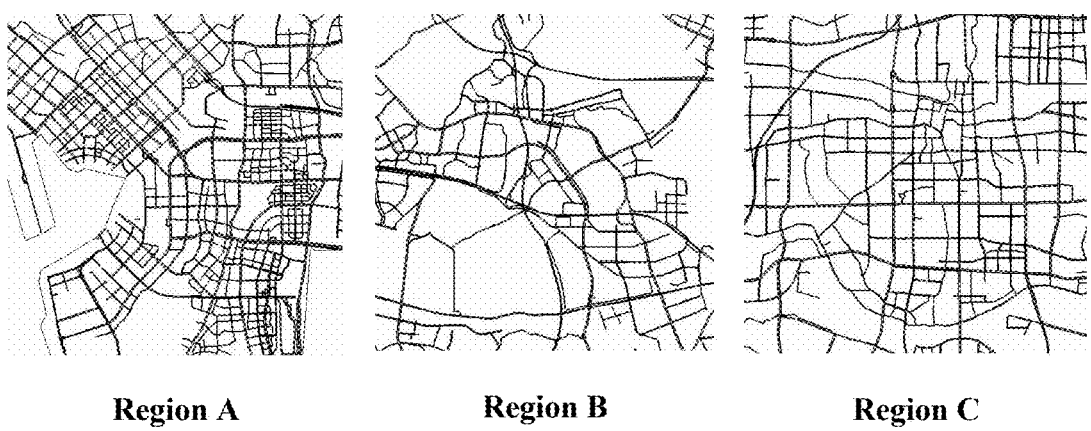
FIG. 2 is a schematic diagram illustrating the segmentation of spatial scenario units based on a road network, as provided in some embodiments of the present application.

For different types of roads, varying buffer widths are set. By way of example, the buffer widths for highways, primary roads, secondary roads, and tertiary roads can be set to 30, 20, 20, and 15 meters, respectively. A buffering analysis is then conducted to obtain road buffer zones (also known as road network buffer zones). The road network buffer zones with different widths are used to segment the target study area. At the same time, disordered or fragmented regions and discontinuous regions are further processed to generate segmented patches (i.e., vector patches, also referred to as road network cutting units or road network cutting spatial scenario units). The results of the road network cutting spatial scenario units are shown in FIG. 2. As illustrated in FIG. 2, the dense road network divides the target study area (regions A, B, and C) into multiple units. Moreover, it is evident that due to varying economic development levels and ecological scenarios across different urban areas, the shapes, densities, and boundary characteristics of the road network cutting spatial scenario units differ as well.

This embodiment uses a dense road network in conjunction with road buffer zones to segment spatial scenario units, effectively reducing the fragmentation of patches and improving the quality of the segmentation.

Considering the issue of ambiguous boundary identification between urban and non-urban spatial scenarios when segmentation is solely based on the road network, this embodiment first performs segmentation using the road network, and then applies an object-oriented segmentation algorithm to divide "superpixels" with similar features, such as texture, brightness, and color. Afterward, the segmentation results from the road network are overlaid to clearly define the urban and non-urban boundaries, effectively avoiding the emergence of fragmented boundaries.

The object-oriented segmentation is accomplished using the Simple Non-Iterative Clustering (SNIC) image segmentation algorithm. SNIC segments "superpixels" with similar features such as texture, brightness, and color into smaller regions with comparable characteristics, capturing better structural information and local features. By applying spatial clustering, SNIC effectively improves land use classification results and can distinctly identify urban and non-urban boundaries in scenario classification, thus accurately delineating urban functional scenarios as well as agricultural and ecological regions.

After partitioning the target study area using road network data at different scales, spatial scenario identification can be performed. This process is divided into two parts: non-urban spatial scenario identification and urban functional scenario identification. A detailed description of each follows.

First, the identification of non-urban spatial scenarios is carried out. This process can include the following steps: using the cloud computing platform GEE in combination with Sentinel imagery, the supervised classification method of Random Forest is employed to extract the distribution of various non-urban spatial scenarios. The extraction of supervised classification sample points for Random Forest follows these steps: water bodies, cultivated land, aquaculture areas, other vegetation, and impermeable surfaces are extracted from the Sentinel imagery. Interpretation keys are established through visual interpretation to distinguish between spatial scenario types, such as cultivated land, water bodies, aquaculture areas, other vegetation, unused land, and impermeable surfaces, thereby creating a sample database. When extracting training sample points, the total number of samples for each category is maintained at a 1:1 ratio. Of these, 70% of the sample points are used for training, and 30% are reserved for accuracy validation.

From the perspective of regional multidimensional attribute analysis, the internal attributes of non-urban spatial scenarios are relatively homogeneous, with each vector patch not exhibiting mixed land use characteristics. Therefore, non-urban spatial scenarios can be approximately represented by land use types. This is achieved by matching land use vector data to the corresponding spatial scenarios. Specifically, the land use types are assigned to the following spatial scenarios: orchards correspond to economic forest scenarios, paddy fields correspond to paddy field scenarios, dry land corresponds to dry land scenarios, and aquaculture areas correspond to aquaculture scenarios. Other types of forested land (including forestland, shrubland, and sparse woodland), excluding orchards, correspond to other forestland scenarios. Grasslands correspond to grassland scenarios, water bodies correspond to water scenario, and unused land corresponds to unused land scenarios.

The process of dividing the basic units of urban and non-urban spatial scenarios can include the following steps: using the Sentinel-2 remote sensing imagery provided by the cloud computing platform GEE, in conjunction with POI data, the supervised classification method of Random Forest is applied to extract the distribution of various spatial scenarios. This involves using Random Forest to classify the segmentation results. Specifically, 70% of the sample points are used for training, and 30% of the sample points are reserved for accuracy validation.

In the context of non-urban spatial scenario identification, the process begins with the extraction of water bodies, cultivated land, aquaculture areas, other vegetation, and impermeable surfaces. Due to the significant spectral differences exhibited by these land cover types (such as cultivated land, water bodies, aquaculture areas, other vegetation, and impermeable surfaces) in multispectral image, this implementation utilizes visual interpretation of Sentinel imagery to establish interpretation keys based on different land features. These keys are used to classify scenario types such as cultivated land, water bodies, aquaculture areas, other vegetation, unused land, and impermeable surfaces, thereby creating a sample database. For supervised classification, the training samples must meet the following criteria: (1) the training samples must be representative; (2) the sample sizes for each category are balanced; (3) the training and validation samples must be independent of each other; and (4) the training sample size must be sufficiently large. Based on these principles, during the extraction of training sample points, the total number of samples for each category is ensured to be in a 1:1 ratio, and the training and validation samples are selected in a 3:7 ratio.

Exemplarily, the characteristics of different land cover types in Sentinel-2 remote sensing images can be described as follows:

Cultivated Land: appears light green, with well-defined patches that are regularly distributed and exhibit clear boundaries;

Forest: displays high canopy closure, a dark green color, with intact patches that are distinctly different from surrounding land cover types;

Water Bodies: appears deep blue, with significant contrast to surrounding land covers. Water bodies often have dendritic or linear shapes, with clear and well-defined boundaries;

Impermeable Surfaces: feature scattered, irregularly sized patches with notable color variation across different regions. These areas are distinctly different from water bodies and vegetation;

Aquaculture Areas: recognizable by a grid-like, densely arranged pattern with varying shades of color, and typically containing water body information within the grid structure.

To effectively obtain regional ecological, agricultural, and urban spatial scenarios with spatial scenarios as geographic units, some embodiments also include the refinement of non-urban spatial scenario classification by leveraging existing land use data. This allows for the further identification of specific spatial scenarios corresponding to economic forests and grasslands.

The study employs a supervised classification method based on Random Forests to extract regional land use, further refining the classification with existing land use data. The Random Forest-based supervised classification operates at the pixel level, using sample point data for supervised classification. Given the difficulty in distinguishing economic forests and grasslands in the imagery, the study utilizes known land use distribution maps to re-extract the economic forest and grassland areas.

Subsequently, based on the segmentation of the target study area using a road network to generate segmented patches, urban functional scenarios are identified through the following steps: first, training sample points are established, and the segmented patches are labeled to categorize them into either industrial or non-industrial scenarios within the urban functional scenarios. For non-industrial scenarios, POI points are used to identify location-based scenarios and density-based scenarios. This helps determine the dominant spatial scenario within the non-industrial scenario, and the dominant spatial scenario is then used as the identified result for that non-industrial scenario.

Since POI data, which is centered around human activity trajectories, is more suitable for identifying urban functional scenarios, and spectral features can describe structural information in remote sensing images to capture internal scenario differences, a classification method for scenario understanding is proposed. This method integrates both spectral features and POI data to enhance the accuracy of scenario classification. By combining the strengths of both data sources—spectral features for distinguishing spatial structures and POI data for capturing human activity patterns—it improves the identification and differentiation of various urban functional scenarios.

Specifically, the process of establishing training sample points involves the following steps: first, based on the Sentinel-2 dataset (Sentinel-2 image), spectral analysis and texture information extraction are performed for industrial and non-industrial scenarios to determine the optimal bands. Once the optimal bands are identified, training sample points are established by combining the selected bands with POI data. This approach ensures that both spectral characteristics and human activity patterns are incorporated into the training process, enhancing the accuracy and reliability of the scenario classification.

The spectral analysis of the image includes analyzing the spectral mean, standard deviation, and brightness of industrial spatial scenarios across different bands. This is combined with vegetation indices such as the NDVI, NDWI, and NDSII to identify the distinguishing features between industrial and non-industrial scenarios. Meanwhile, recognizing the importance of texture information for scenario classification, texture features are extracted from the Sentinel data. By analyzing the spectral mean, standard deviation, brightness, and the average values and standard deviations of vegetation indices across different bands for industrial spatial scenarios, and integrating these with texture information, the study identifies the distinguishing characteristics between industrial spatial scenarios and other urban functional scenarios (non-industrial scenarios). This process leads to the identification of the optimal bands, which are then used as one of the key methods for extracting industrial scenarios.

In an exemplary analysis of the spectral differences in urban functional scenarios, the distinguishing features between industrial and non-industrial scenarios can be described as follows. For industrial scenarios in Sentinel-2 image, the characteristics may include: a high proportion of built-up land within the scenario units, typically appearing in deep blue or light orange colors with regular, elongated shapes; within the image patches, industrial areas often manifest as densely arranged, orderly rectangular blocks, predominantly dark gray to black in color, and usually aggregated in large, contiguous patches; the construction areas within the patches are densely and regularly arranged, with significant color contrasts and a substantial proportion of built-up land. On the other hand, non-industrial scenarios may exhibit the following features: the image patches are densely and randomly arranged, lacking distinct characteristics; the built-up land within the patches appears as irregularly scattered blocks, often accompanied by regional shading; and independent construction areas display prominent irregularities in shape and distribution.

After distinguishing industrial and non-industrial scenarios, it is necessary to identify the specific urban functional scenarios within each patch of the non-industrial scenario. Given the public recognition and spatial scale, relying solely on a single feature for identification can lead to significant errors. Taking a train station as an example, a scenario unit may only contain 1-2 POIs representing the train station, whereas the number of POIs related to services like daily life or shopping can easily surpass the number of those representing the train station. In this case, the dominant scenario of the unit is categorized as a public service scenario, rather than simply classifying it as a commercial scenario based on POI count. Therefore, considering the influence of both the public recognition of the geographic entities represented by POIs and their spatial area on scenario type classification, different POIs are first identified in terms of their location-based and density-based characteristics. By employing distinct feature parameters, a more accurate differentiation of urban functional scenarios can be achieved.

The first step is to perform location-based scenario identification. Location-based POIs represent geographic entities with high public recognition and relatively large spatial coverage. Their characteristics can determine the primary land use type of a scenario unit. Examples of such POIs include airports, train stations, and large tertiary hospitals. For identifying location-based urban functional scenarios, the analysis primarily utilizes two vectors: Frequency Density (FD) and Category Ratio (CR). The FD vector helps quantify the distribution density of POIs within the scenario unit, while the CR vector calculates the proportion of each category of POI within the unit. Specifically, the CR vector computes the ratio of POIs belonging to each secondary spatial scenario relative to the total number of POIs in that scenario unit. When the proportion of POIs belonging to a specific secondary spatial scenario exceeds a preset threshold, this indicates that the dominant spatial scenario of the unit corresponds to that secondary spatial scenario which surpasses the threshold. This method enables the accurate identification of the primary urban functional scenario by considering the quantity and proportion of location-based POIs in each scenario unit.

Specifically, for each scenario unit, the FD vector $F_i$ is constructed, which represents the FD of the i-th category of POI in that scenario unit. The formula is as follows:

$$F_i = \frac{POI_i}{POI_I} \quad (1)$$

In the formula, $POI_i$ represents the number of POIs of the i-th category within the scenario unit, and $POI_I$ denotes the total number of POIs of the i-th category within the target study area.

To facilitate the comparison of POIs across different spatial scenarios, a dimensionless normalization is applied to the POIs based on the FD vector:

$$F_{i\_nor} = \frac{F_i - F_{min}}{F_{max} - F_{min}} \quad (2)$$

$F_{i\_nor}$ represents the normalized density frequency of the i-th category of POIs within the scenario unit, $F_i$ denotes the FD, and $F_{min}$ and $F_{max}$ indicate the minimum and maximum FDs of the i-th category of POIs across all scenario units, respectively.

After the dimensionless normalization, the CR vector is constructed, where $C_i$ represents the percentage of the i-th category of POIs within the scenario unit relative to the total number of all types of POIs in that unit (i.e., the category's proportion).

$$C_i = \frac{F_{i\_nor}}{\sum_{i\_nor=1}^{11} F_{i\_nor}} \quad (3)$$

In the formula, $F_{i\_nor}$ represents the normalized density frequency of the i-th category of POIs within the scenario unit.

Next, density-based scenario identification is carried out. Density-type POIs refer to geographical entities with a high spatial distribution density, low public awareness, and small land areas. These are identified through density distributions, which help to define the dominant spatial scenarios of units, such as POI data related to shopping services, dining services, accommodation, and entertainment. Since the scenario type is influenced not only by the number of POIs but also by the land area occupied by the geographical entities, it is important to consider the impact of the construction area of different types of geographical entities when identifying scenario types, especially in areas where multiple scenario types overlap. This ensures a more comprehensive and accurate scenario classification.

Based on the national business type classification standard GB/T18106-2010 and related materials, the land area corresponding to each POI entity is determined. Then, different weights are assigned based on the type of POI and its land area. It can be understood that the specific weight assignment can be implemented in various ways. For example, a weight of 0.1 can be set for entities with an area of 200 m², and this baseline can be used to assign weights to geographical entities with different land areas. Considering that sectors such as healthcare, education and training, as well as shopping, involve multiple types of geographical entities, the average land area for different POI types is derived from the product of the proportion of each POI type and the unit area, using data obtained from Gaode (Amap). This average land area is then used to form the final POI geographical entity area-weight table, as shown in Table 3:

TABLE 3

POI geographical entity area and weight

| POI type | Secondary classification | Floor space/m² | Weight | Remark |
|---|---|---|---|---|
| Public service scenario | Administrative agency | 7000 | 3.500 | |
| | Science and education training | 100000/ 3000/ 15000 | 12.020 | Higher school/secondary school/primary school |
| | Medical and health care | 50000/ 15000/ 1000 | 2.435 | General hospital/Specialty hospital/Clinic pharmacy |
| Business service | Leisure sports | 400 | 0.200 | |

TABLE 3-continued

POI geographical entity area and weight

| POI type | Secondary classification | Floor space/m² | Weight | Remark |
|---|---|---|---|---|
| scenario | Catering | 300 | 0.150 | |
| | Shop | 50000/ 6000/100 | 1.865 | Shopping center/supermarket/ convenience store |
| | Residential service | 800 | 0.400 | |
| | Finance and insurance | 500 | 0.250 | |
| | Life service | 200 | 0.100 | |
| Residential scenario | Residential district | 80000 | 40.000 | |
| Industrial scenario | Industrial park | 50000 | 25.000 | |

After determining the land area and weights of each POI, the identification of urban functional scenarios is carried out using kernel density and similarity models.

Kernel Density Estimation (KDE) is a non-parametric method used to estimate the value at unknown points based on known data points. It is a technique that examines the spatial distribution of data based on its intrinsic characteristics. The theoretical foundation of KDE is rooted in the first law of geography, which posits that the degree of association between entities is inversely related to the distance between them. The closer the entities are, the stronger the association, and the higher the density value is at the core elements. KDE allows for the analysis of spatial density distribution within a given region. The specific formula is as follows:

$$P_n(X_i) = \frac{1}{nh_n} \sum_{j=1}^{n} K\left(\frac{x_i - x_j}{h_n}\right) \quad (4)$$

In the formula, n represents the number of spatial geographic elements (POI points), $P_n(X_i)$ denotes the density estimate at the i-th POI point, $h_n$ is the smoothing parameter, also known as the bandwidth, which controls the smoothness of the estimate. K represents the weight, and $x_i$ and $x_j$ refer to the i-th and j-th geographic element samples, where i, j=1, 2, 3, . . . , n.

When using KDE for POI analysis, the choice of bandwidth $h_n$ must be carefully considered. In this embodiment, a bandwidth of 500 meters is used as the average bandwidth. While obtaining the spatial distribution of kernel density for each type of POI, statistical analysis is conducted on the various urban functional scenario units. This process allows for the identification of the dominant spatial scenario within each unit, thereby determining the type of urban functional scenario for that specific area.

This embodiment identifies urban functional scenarios using KDE and similarity models, fully considering the inherent characteristics of the data and the principles of geographic distribution. This approach enhances the accuracy and effectiveness of scenario identification.

In this embodiment, after completing the identification of non-urban spatial scenarios and urban functional scenarios, the step of extracting and assigning the blue-green-grey ratio to each spatial scenario patch is carried out. Specifically, the blue-green-grey ratio attribute is primarily used for urban functional scenario and ecological functional scenario related to ecological leisure areas. For the extraction of the blue-green-grey ratio, Sentinel image is used in combination with the GEE cloud computing platform. The supervised classification method of Random Forest is employed to extract the areas of water bodies (blue), vegetation (green), and impervious surfaces (grey) within each scenario patch. The ratio of each element (water, vegetation, and impervious surface) to the total area of the patch is then calculated. In this process, 70% of the sample points are used for training, and 30% are used to validate the accuracy of the classification. The blue-green-grey ratio attributes are assigned to each spatial scenario patch, allowing for differentiation of value differences within the spatial scenarios based on these attributes. This provides a data foundation for further research on ecological carrying capacity, spatial optimization, and other studies. It also introduces a new methodological framework for regional ecological security assessments and management.

In summary, the embodiment of this application provides a method for constructing spatial scenarios based on a blue-green-grey ratio. This method aims to move beyond traditional land classification approaches based on land cover or land use characteristics. It seeks to construct a framework that reflects the functional differences within the same type of land, which arise due to variations in location or the spatial relationships of the spatial scenarios.

The method provided in this embodiment replaces traditional land use/cover with spatial scenarios, introducing the blue-green-grey ratio as one of the attributes of spatial scenarios. This approach can describe the internal heterogeneity of the same functional zone, highlighting how variations in location lead to differences in the economic and ecological value of land use/cover.

The above-described embodiments are merely preferred examples of this application and are not intended to limit the scope of the application. Those skilled in the art will recognize that various modifications and variations can be made to the application. Any modifications, equivalents, or improvements made within the spirit and principles of this application are considered within the scope of protection of this application.

What is claimed is:

1. A method for constructing spatial scenarios based on a blue-green-grey ratio, comprising the following steps:
   constructing a spatial scenario classification system, wherein
   the spatial scenario classification system comprises primary spatial scenarios, which comprise the following types: agricultural functional scenarios, urban functional scenarios, and ecological functional scenarios; the primary spatial scenarios are further subdivided into multiple secondary spatial scenarios; each secondary spatial scenario is formed by vector patches, also referred to as spatial scenario patches; each spatial scenario patch is set to comprise the following attributes: a type name, a perimeter, an area, and a blue-green-grey ratio; and a blue-green-grey ratio attribute is used to represent internal heterogeneity within a same spatial scenario;
   acquiring spatial data for a target study area, where the spatial data comprises at least point of interest (POI) data, Sentinel datasets, and road network data at different scales;
   preprocessing the POI data, the Sentinel datasets, and the road network data at different scales separately;
   identifying the urban functional scenarios and non-urban spatial scenarios based on preprocessed spatial data, the non-urban spatial scenarios comprising the agricultural functional scenarios and the ecological functional scenarios; and for all patches contained in identified urban functional scenarios and ecological functional scenarios, using ArcGIS software to calculate a perimeter and an area of each spatial scenario patch; and assigning the attributes of the type name, the perimeter, the area, and the blue-green-grey ratio to each spatial scenario patch.

2. The method according to claim 1, wherein the identification of the non-urban spatial scenario comprises the following steps:

using a supervised classification method of Random Forest to extract the distribution of each non-urban spatial scenario based on a cloud computing platform Google Earth Engine (GEE), in combination with Sentinel imagery;

extracting supervised classification sample points for the Random Forest method according to the following steps:

extracting water bodies, cultivated land, aquaculture land, other vegetation, and impervious surfaces from the Sentinel imagery, establishing interpretation keys through visual interpretation to classify spatial scenario types of cultivated land, water bodies, aquaculture land, other vegetation, unused land, and impervious surfaces, and creating a sample database for the non-urban spatial scenarios;

when extracting training sample points for the non-urban spatial scenarios, a sample distribution ratio for each category being 1:1, with 70% of the sample points being used for training, and 30% being used to validate the accuracy.

3. The method according to claim 2, wherein after identifying the non-urban spatial scenarios, the method further comprises the following steps:

using existing land use data to perform a detailed reclassification of the non-urban spatial scenarios, to identify corresponding spatial scenarios for economic forests and grasslands.

4. The method according to claim 3, wherein the identification of the urban functional scenarios comprises the following steps:

segmenting the target study area using the road network data at different scales to obtain segmented patches;

establishing training sample points for the urban functional scenarios, and labeling the segmented patches to classify them into either industrial or non-industrial scenarios within the urban functional scenarios; and identifying location-based and density-based scenarios for POI points within the non-industrial scenarios to determine a dominant spatial scenario of the non-industrial scenarios, and taking the dominant spatial scenario as an identified result for that non-industrial scenario.

5. The method according to claim 4, wherein the establishment of training sample points for the urban functional scenarios comprises the following steps:

performing, based on the Sentinel datasets, image spectral analysis and texture information extraction for the industrial and non-industrial scenarios to determine optimal bands; and establishing, based on the optimal bands, training sample points for the urban functional scenarios.

6. The method according to claim 5, wherein the image spectral analysis comprises: analyzing a spectral mean, a standard deviation, and brightness of the industrial spatial scenario across various bands, and combining a Normalized Difference Vegetation Index (NDVI), a Normalized Difference Water Index (NDWI), and a Normalized Difference Impervious Surface Index (NDSII) to identify differential features between the industrial and non-industrial scenarios.

7. The method according to claim 6, wherein preprocessing the POI data comprises the following steps:

removing duplicates and cleaning the data for repeated names and coordinates in the POI data to obtain cleaned POI data;

reclassifying the cleaned POI data to obtain reclassified POI data;

establishing a correspondence between the reclassified POI data and the secondary spatial scenarios; and identifying location-based and density-based scenarios for the POI points within the non-industrial scenario to determine the dominant spatial scenario of the non-industrial scenario, specifically, analyzing the spatial distribution and density of the POI points to classify the non-industrial scenario as either location-based or density-based, to identify a prevailing spatial scenario:

based on the correspondence between the reclassified POI data and the secondary spatial scenarios, identifying location-based and density-based scenarios for the POI points within the non-industrial scenario to determine the dominant spatial scenario of the non-industrial scenario.

8. The method according to claim 7, wherein the identifying the location-based scenarios and density-based scenarios of POI points within the non-industrial scenarios comprises:

classifying the POI points within the non-industrial scenario into location-based POIs and density-based POIs from the perspectives of public recognition and spatial area coverage;

for the location-based POIs, constructing a frequency density vector of corresponding scenario units and calculating a proportion of POIs within the scenario unit, if the proportion exceeds a predefined threshold, a dominant spatial scenario of the scenario unit being determined; and for the density-based POIs, identifying the urban functional scenarios using kernel density and similarity models based on a pre-obtained table of POI geographical entity areas and weights.

9. The method according to claim 1 wherein the preprocessing of the Sentinel dataset comprises the following steps:

filtering the Sentinel dataset based on cloud coverage to obtain screened remote sensing images; and applying quality control to perform low-quality area masking on the screened remote sensing images, followed by annual mean processing of the masked remote sensing images to obtain mean images.

10. The method according to claim 4, wherein the preprocessing of the road network data at different scales comprises the following steps:

extracting different types of roads from the road network data at different scales based on road classification to establish a dense road network; the different types of roads comprising one or more of the following: highways, primary roads, secondary roads, and tertiary roads;

setting different buffer widths for various types of roads;

constructing road network buffers centered on the roads within the dense road network based on the buffer widths; and correspondingly, the segmenting the target study area using the road network data at different scales to obtain segmented patches is specifically as follows:

using the road network buffers to segment the target study area, resulting in segmented patches.

\* \* \* \* \*